United States Patent Office 3,399,341
Patented Aug. 27, 1968

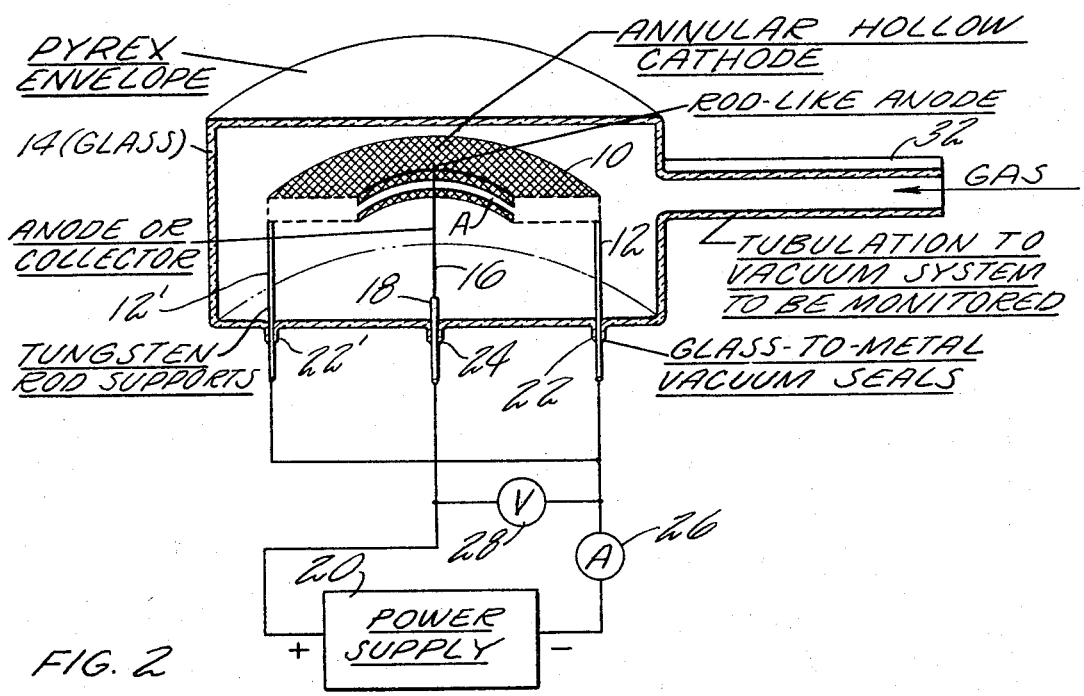
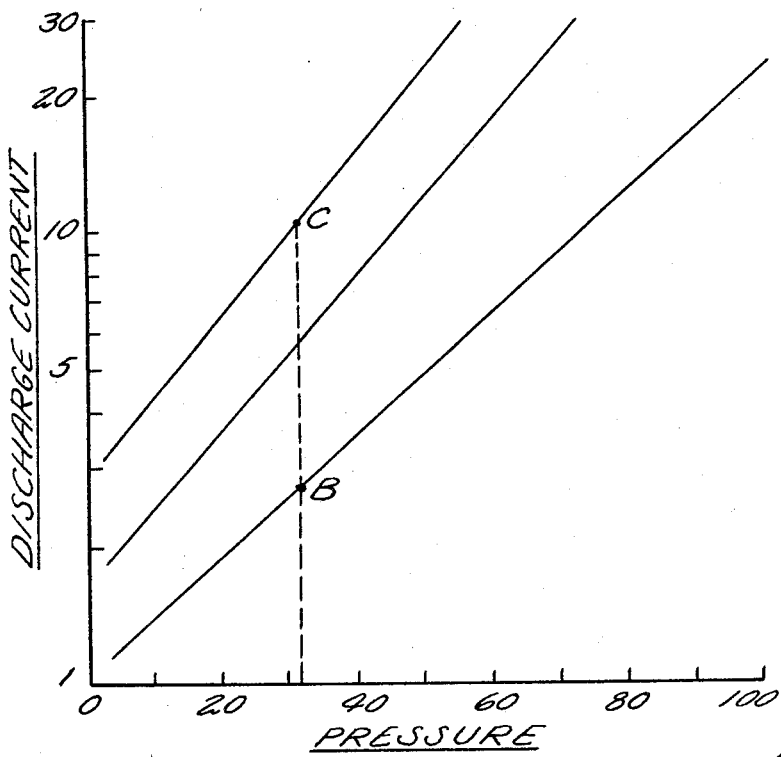

3,399,341
VACUUM PRESSURE MEASUREMENT APPARATUS UTILIZING HOLLOW CATHODE DISCHARGE
Conrad M. Banas, Manchester, and Thomas L. Churchill, Glastonbury, Conn., and Donald E. Powers, Springfield, Mass., assignors to United Aircraft Corporation, East Hartford, Conn., a corporation of Delaware
Filed May 24, 1965, Ser. No. 458,028
8 Claims. (Cl. 324—33)

ABSTRACT OF THE DISCLOSURE

A vacuum gauge to measure low pressures in the 0.5 to 500 micron range in which a hollow cathode discharge device is enclosed in a substantially sealed envelope which is attached to the wall of a vacuum chamber. The hollow cathode device is actuated, and the vacuum pressure is determined as a function of discharge current and discharge voltage.

This invention relates to vacuum pressure gauges, and particularly to a new and improved form of gas discharge pressure gauge utilizing a hollow cathode discharge.

The novel hollow cathode pressure gauge described herein is useful principally in the pressure range or from 0.5 to 500 microns, with its most important application being in the range of between 0.5 and 20 microns. This latter pressure range is in the overlap region of thermocouple type and ionization type pressure gauges in which neither is ideally suited for accurate measurements.

The hollow cathode pressure gauge of this invention is extremely sensitive to pressure variations, thereby permitting measurements of much smaller pressure increments than have hitherto been measurable with other gauges of this type. Also, the effects of electrode contamination common to gas discharge pressure gauges has been virtually eliminated.

The hollow cathode pressure gauge utilizes a well known solid or perforated wall hollow cathode enclosed in an envelope which is attached to the wall of a vacuum chamber. Pressure is determined as a function of the discharge current obtained at a given voltage, or as a function of voltage at a constant current.

It is therefore an object of this invention to produce a novel pressure gauge utilizing a hollow cathode discharge.

Another object of this invention is a novel hollow cathode pressure gauge which is extremely sensitive to small pressure variations.

A further object of this invention is a novel pressure gauge which is simple, reliable, durable, inexpensive and accurate.

These and other objects of the invention may be better understood by referring to the following description and claims, read in conjunction with the accompanying drawings, in which:

FIGURE 1 shows a sectional view of a preferred embodiment of the hollow cathode pressure gauge using a perforated wall annular cathode; and FIGURE 2 is a graph showing typical variations of hollow cathode discharge current with pressure at constant voltage.

Numerous types of simple gauges are available for measurement of gas pressures on the order of 100 microns and above. Likewise, suitable instrumentation is available for measurements at pressures below 0.1 micron. In the intermediate range, however, and especially in the range from 0.5 to 20 microns, existing pressure gauges have severe limitations. For example, pressure in the 0.5 to 20 micron range might presently be determined by a McLeod gauge, a capacitance manometer, a thermocouple gauge, or an Alphatron gauge. Of the above, the McLeod gauge is an absolute measuring device, and would presumably be used for calibration of the hollow cathode pressure gauge. In experimental applications, however, the McLeod gauge has the serious disadvantage that individual pressure measurements are time consuming, and it is impossible to make rapid measurements which might be required to follow transients. In addition it requires liquid nitrogen cooling for low pressure measurements due to relatively high vapor pressure of mercury. Of the others, the capacitance manometer is quite expensive, and is somewhat inaccurate in the 0.5 to 5 micron range, the thermocouple gauge yields poor accuracy at pressures below 10 microns and is subject to calibration drift. The Alphatron gauge is also subject to calibration drift and, in addition, represents a health hazard due to the integral radioactive source.

The hollow cathode pressure gauge described herein provides a means for accurate measurements in a pressure range for which no other gas discharge gauge is presently suited. In addition very small pressure increments may be measured, changes in pressures may be followed accurately, and the electrode configuration reduces variations in measurements due to contamination.

Hollow cathode discharge is well known, operation of such devices being described in detail in copending application Ser. No. 417,399, entitled "Annular Hollow Cathode Discharge Apparatus," filed Dec. 10, 1964, and assigned to the same assignee, to which reference is hereby made. Briefly, the conventional hollow cathode comprises a closed, hollow cylinder fabricated from wire mesh, perforated metal or solid metal with a circular aperture in one end. When the cathode is biased to a high negative potential with respect to its surroundings which act as the anode, and when the pressure level is approximately 1000 microns or less, a well-collimated pencil beam of high current density, high energy electrons emanates from the aperture. In another embodiment, such as shown in FIGURE 1, the cathode is substantially annular and produces a thin, disc-shaped beam in which electrons are emitted from a circular aperture in the cathode and are accelerated radially inward toward a workpiece or anode.

Referring now to FIGURE 1, an annular hollow cathode 10 shown as a perforated wall cathode fabricated from fine mesh wire screen of stainless steel is supported by arms 12 and 12' preferably of tungsten within an airtight glass envelope 14. Cathode 10 contains a narrow aperture A extending symmetrically about its inner diameter. An anode 16 is positioned at the center of the annulus by means of a support 18. Anode 16 is preferably a conductor such as tungsten, but may be an insulator if a substitute conducting anode such as the metallic support 18 is provided.

A source of DC power 20 of typically 500 to 5000 volts is provided, the negative lead being connected through glass to metal seals 22 and 22' to cathode 10 either directly or via arms 12 and 12' if the arms are conductors, and the positive lead being connected to anode 16 through glass to metal seal 24 and support 18. An ammeter 26 may be connected in series with, and a voltmeter 28 may be connected across power supply 20.

Glass envelope 14 is formed so that it may be connected easily to a vacuum chamber whereby the pressure in the chamber may be measured. Tubulation 32 is shown, but any type of seal or connector may be used.

When the chamber has been evacuated to the desired pressure of less than 1000 microns, the apparatus is energized and a discharge is initiated between the cathode and the anode whereby a focused beam of electrons is emitted from aperture A and bombards the anode 16 uniformly around its circumference. The cathode current as measured by ammeter 26 and the anode-to-cathode potential drop as measured by voltmeter 28 will be indicative of pressure when calibrated to the particular gas in the enclosure.

FIGURE 2 shows graphically the relationship between current and pressure at various voltages. Current is approximately proportional to the 3/2 power of the pressure for normal operation. If the voltage is held constant by well-known regulation circuitry the pressure may be determined directly as a function of current; conversely at a constant current, pressure and voltage are directly related as may be seen by a cross plot of FIGURE 2. Well-known calibration techniques may be used to accurately determine pressure for any gas.

The hollow cathode of the gauge may also serve in the added capacity of cathode for a gas discharge experiment. In such a case the proper operating pressure would be established by adjusting voltage and current to coincide with a reference point (point B is FIGURE 2) and then increasing voltage and current to obtain the desired operating point C.

Typical currents encountered in the preferred mode of operation are about 1 milliampere, currents of this magnitude being insufficient to deteriorate the anode. Consequently the gauge has an indefinite lifetime. Shielding may be required to prevent accumulation of sputtered cathode material on insulating surfaces between the anode and cathode which might cause an eventual short circuit. Ion shielding may also be desirable to prevent ions formed by the discharge from entering the enclosure.

Test results show that the voltage-current characteristics of the hollow cathode discharge are extremely sensitive to pressure, and that relatively small pressure changes in the 1–10 micron range lead to very large changes in hollow cathode discharge current. As may be seen in FIGURE 2 a 50% change in current occurs for a 10 micron change in pressure. Further, gauges having even greater sensitivity to pressure can readily be constructed. It has been noted, for example, that appreciable changes in operating current and/or voltage occur with changes in pressure which are not detectable with existing gauges.

Since the pressure gauge may be made quite small, effects of the gauge on the test environment are minimized. In addition the rapid response of the gauge permits accurate measurements in a very short time period, and the gauge may be activated only at the instant at which a pressure measurement is desired, thereby eliminating all possible detrimental effects on the system. When scaled and calibrated the gauge is applicable to ambient atmospheres covering a large range of atomic weights and to a pressure range of from 0.5 to 500 microns.

While a perforated annular hollow cathode is shown, it is apparent that other forms of hollow cathodes may be used, e.g. spherical, cylindrical or truncated conical, a conventional cathode or a solid wall cathode, if they should prove more convenient for a given application. Likewise the actual construction of the pressure gauge may be varied for various applications. Other changes and modifications may be made by those skilled in the art without departing from the scope of the invention as hereinafter claimed.

We claim:

1. Apparatus for determining the pressure of a gas from the electrical characteristics of a hollow cathode discharge taking place within said gas comprising:
   an enclosure having an opening for the introduction of a gas,
   hollow cathode discharge means including a hollow cathode and an anode within said enclosure,
   a source of power,
   means connecting said power source with said hollow cathode discharge means whereby a hollow cathode discharge is produced by said hollow cathode discharge means,
   and means for selectively measuring the current and voltage produced by said hollow cathode discharge means.

2. Apparatus as in claim 1 in which said hollow cathode is annular.

3. Apparatus as in claim 2 in which said annular hollow cathode comprises a perforated wall cathode.

4. Apparatus as in claim 2 in which said annular hollow cathode comprises a solid wall cathode.

5. Apparatus as in claim 2 in which the said anode comprises a conductive rod positioned at the center of said annular cathode.

6. Apparatus as in claim 1 in which said source of power is a DC power supply, the negative side thereof being connected to said cathode and the positive side thereof being connected to said anode.

7. Apparatus as in claim 6 in which the output potential difference of said DC power supply is variable from between approximately 500 to 5000 volts.

8. Apparatus as in claim 7 in which said DC power supply is connected to said anode and cathode through sealing means in said envelope.

References Cited

UNITED STATES PATENTS

| Re. 25,369 | 4/1963 | Redhead | 324—33 |
| 2,654,051 | 9/1953 | Kenty. | |
| 2,768,061 | 10/1956 | Cook et al. | |
| 2,817,030 | 12/1957 | Beck et al. | 324—33 X |

FOREIGN PATENTS

| 555,134 | 8/1943 | Great Britain. |

RUDOLPH V. ROLINEC, *Primary Examiner.*

C. ROBERTS, *Assistant Examiner.*